Figure 10:
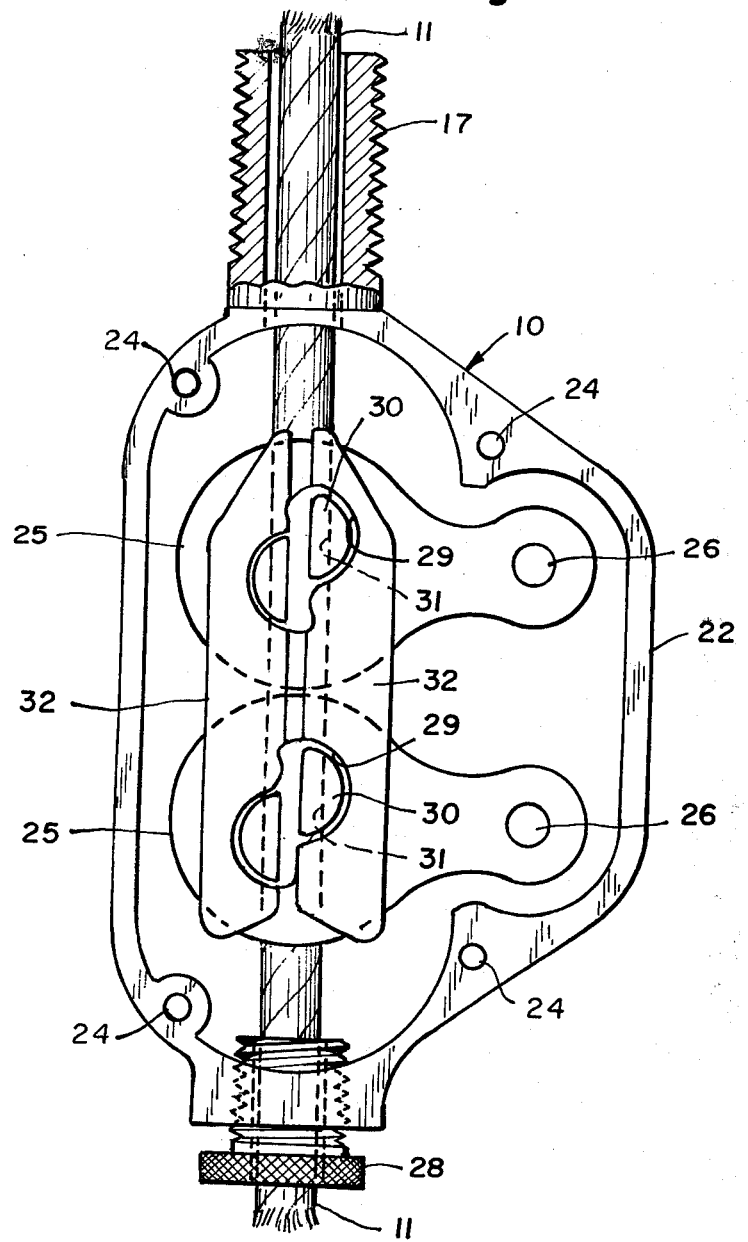

United States Patent [19]

Patterson, III et al.

[11] 3,934,855

[45] Jan. 27, 1976

[54] WIRE ROPE BINDER

[76] Inventors: William W. Patterson, III; Eugene F. Grapes, both of c/o W. W. Patterson Company, 830 Brocket St., Pittsburgh, Pa. 15233

[22] Filed: Sept. 24, 1973

[21] Appl. No.: 399,826

[52] U.S. Cl. .............................. 254/135 R; 254/77
[51] Int. Cl.² .......................................... B66D 1/00
[58] Field of Search ........... 254/161, 163, 164, 198, 254/139.1, 162, 165, 156, 191, 135, 79, 76, 105, 106, 77, 78; 24/69 ST, 71 ST, 68 R, 134

[56] References Cited
UNITED STATES PATENTS

| | | |
|---|---|---|
| 553,466 | 1/1896 | Holzwarth............................ 254/165 |
| 765,190 | 7/1904 | Moyers................................ 254/164 |
| 865,079 | 9/1907 | Butts.................................... 254/163 |
| 1,185,194 | 5/1916 | Gorman............................... 254/164 |
| 1,793,330 | 2/1931 | Magnant.............................. 254/198 |
| 1,920,686 | 8/1933 | Faure................................ 254/135 R |
| 2,087,125 | 7/1937 | Smith et al.......................... 254/161 |
| 2,363,138 | 11/1944 | Moore ................................. 254/164 |
| 2,955,560 | 10/1960 | Howington et al. ................. 254/191 |
| 3,395,892 | 8/1968 | Ratcliff................................ 254/79 |
| 3,410,525 | 11/1968 | Tanson ................................ 254/105 |
| 3,799,503 | 3/1974 | Desplats.............................. 254/76 |

Primary Examiner—Robert J. Spar
Assistant Examiner—Kenneth Noland
Attorney, Agent, or Firm—Buell, Blenko & Ziesenheim

[57] ABSTRACT

The specification discloses various embodiments of apparatus adapted to function as convertible wire rope load binders, container lashing or pullers. All embodiments utilize a wire rope clamp of the type which grips the wire rope on tensioning of the wire rope, and a threaded tubular extension coaxial with the rope pass line, in combination with a slack take-up device, which may be any of a variety of slack take-up devices threaded onto the tubular extension. A preferred embodiment employs a slack take-up device in the form of an over-center or toggle lever and a sheave device attached to the body of the clamp. Another embodiment employs a combined hook and clevis device having a screw connection to the body of the clamp. Another embodiment utilizes a winch device on the tensioning end of the wire rope to provide for tensioning the wire rope. Another embodiment employs a rectangular frame surrounding the body of the clamp, the frame having an opening through which a threaded tubular extension on the clamp body extends. A nut on the tubular extension cooperates with the frame to adjust the body of the clamp in relation to the frame.

6 Claims, 13 Drawing Figures

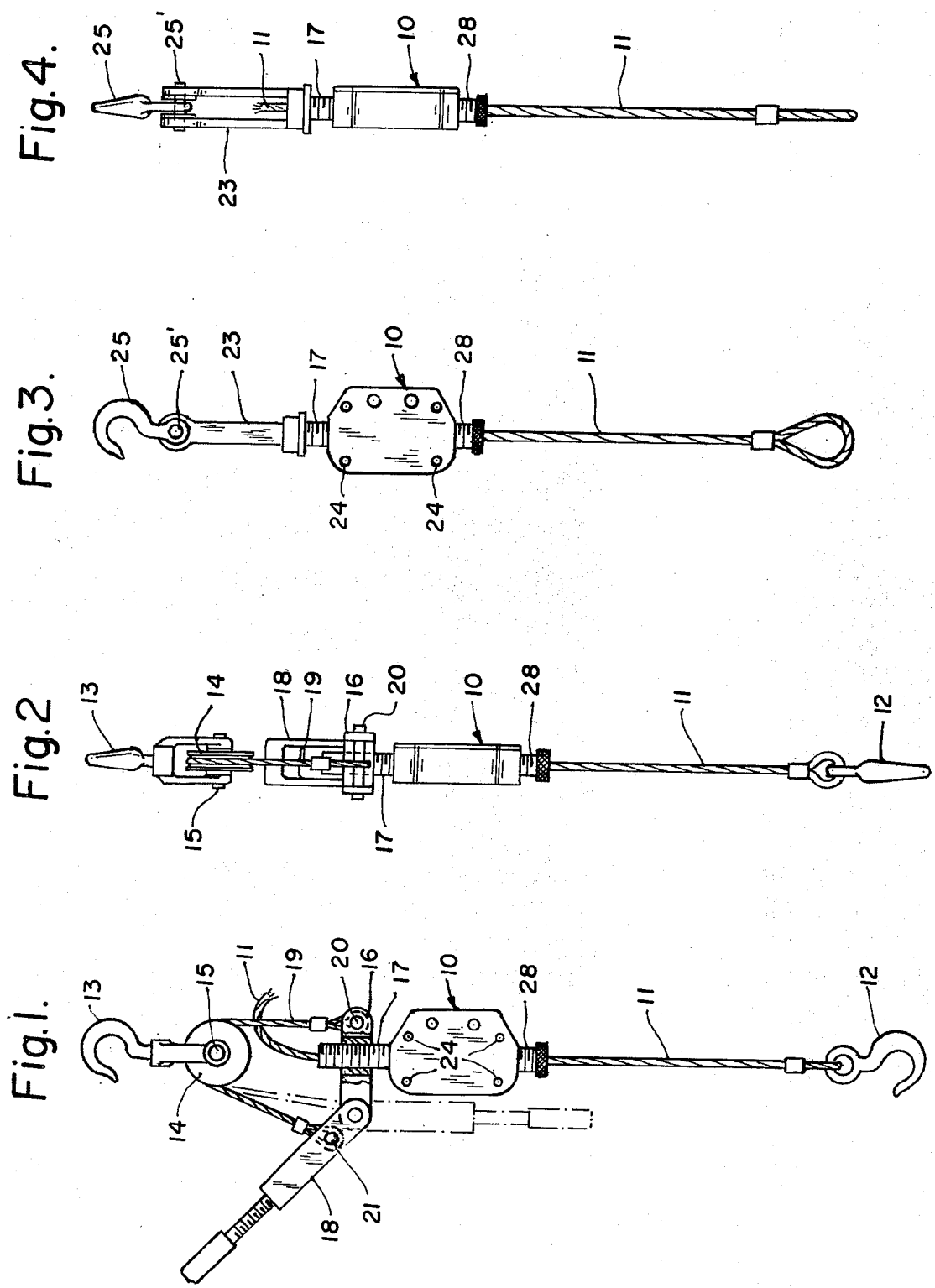

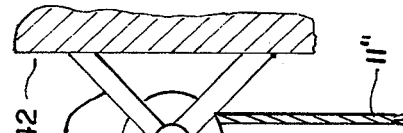
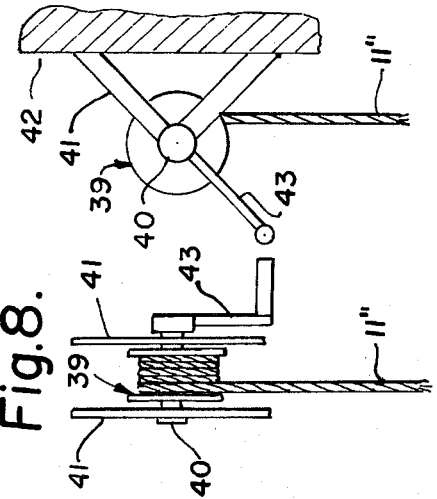
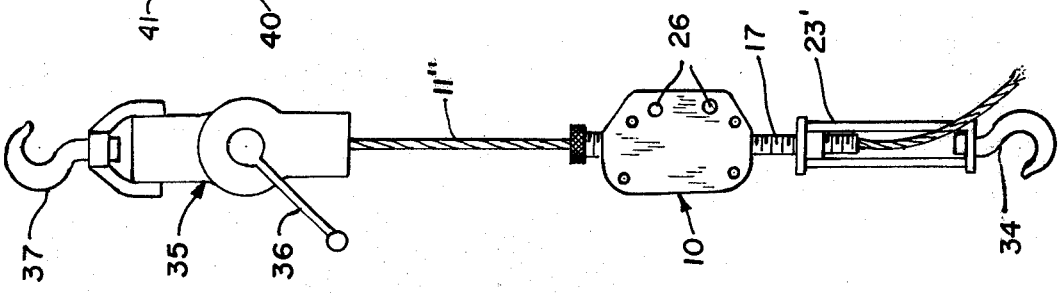
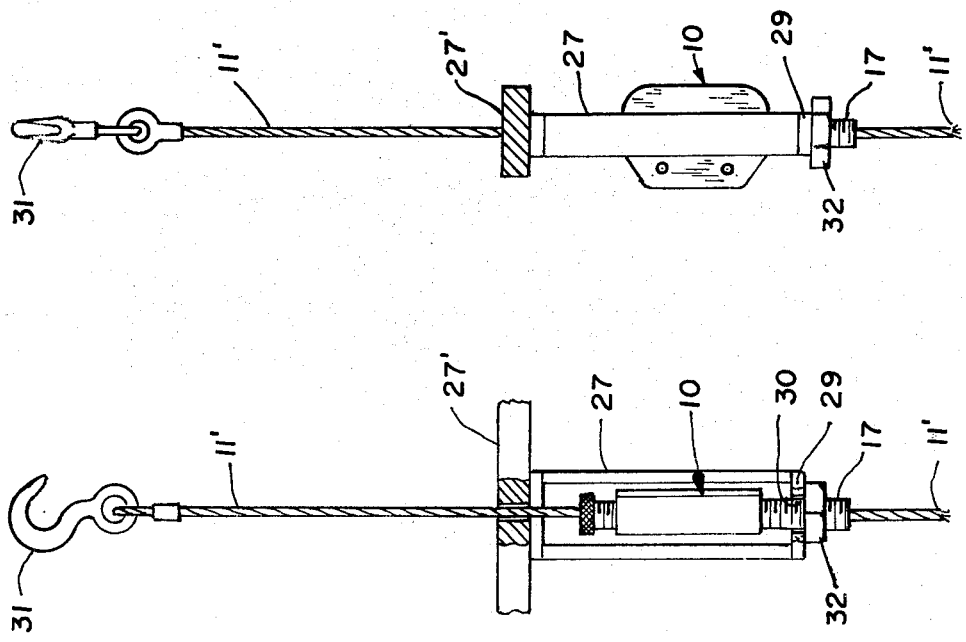

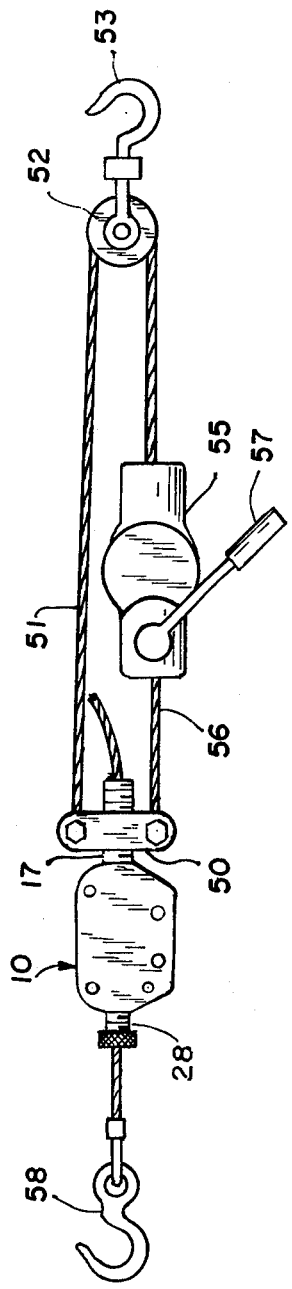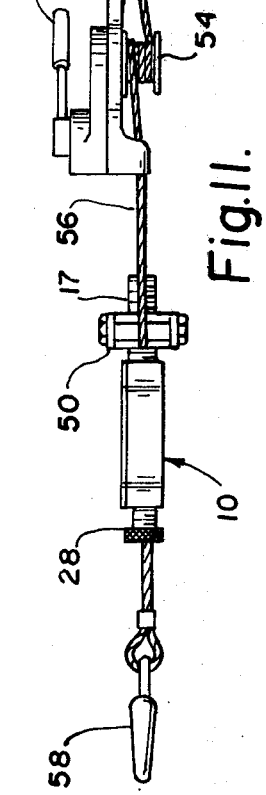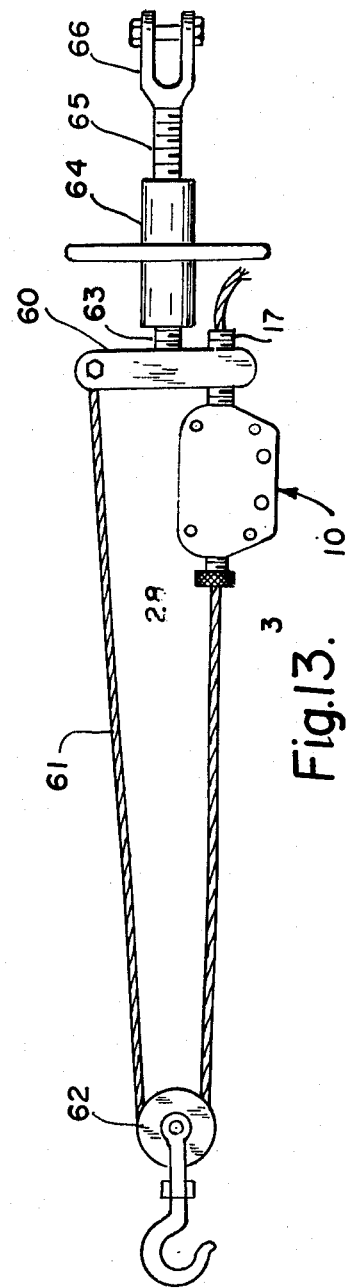

WIRE ROPE BINDER

This invention relates to load binders utilizing a quickly adjustable wire rope clamp.

Load binders of the chain link type have long been known. More recently, with the advent of the wire rope type of load binder, difficulties have arisen because of the inability of existing wire rope clamps to maintain an adequate grip on the wire rope.

In U.S. Pat. No. 3,395,892, issued Aug. 6, 1968, a so-called "over-center load binder and gripping device" is disclosed. This device is difficult to operate because of the over-center toggle arrangement employed.

We propose to provide several embodiments of wire rope load binder apparatus including a preferred embodiment of apparatus, in which a slack take-up device functions cooperatively with the body of a wire rope clamp device.

We propose to provide a preferred embodiment of apparatus in which an over-center toggle lever is detachably secured to the body of a wire rope clamp, and is connected via a wire rope cable and pulley to a hook.

We also propose to provide an embodiment of the invention having a hook and clevis device having a screw connection to the body of a wire rope clamp.

We also propose to provide an embodiment of the invention in which the end of the wire rope, opposite the hook and clevis device, is connected to a winch device.

We also propose to provide an embodiment in which the body of the wire rope clamp is contained within an independently supported rectangular frame and has a threaded lug which projects through a hole in the frame, a nut on the lug cooperating with the frame to exert tension in the wire rope.

The above embodiments of convertible wire rope load binder, container lashing, and puller apparatus are hereinafter more specifically described in relation to the accompanying drawings, wherein:

FIGS. 1 and 2 are side and end elevational views, respectively, of a preferred form of apparatus employing an over-center and pulley arrangement, FIGS. 3 and 4 are side and end elevational views, respectively, of another embodiment, FIGS. 5 and 6 are side and end elevational views, respectively, of another embodiment, FIG. 7 is a side elevational view of another embodiment employing a winch at one end, FIGS. 8 and 9 are fragmental elevational and end views, respectively, of another embodiment employing a different type of winch, FIG. 10 is a side elevational view of the wire rope clamp shown in the preceding views, with a side cover removed for visibility of interior details, FIG. 11 is a top plan view of a puller or binder according to still another embodiment of this invention, FIG. 12 is a side elevational view of the puller or binder of FIG. 11, and FIG. 13 is a side elevational view of an additional embodiment of binder according to the invention.

Referring to FIGS. 1 and 2 of the drawings, the preferred embodiment of load binder apparatus there shown comprises a wire rope clamp 10 of the type shown in FIG. 10 which engages the rope on movement in one direction and releases the rope on movement in the other direction and hereinafter more fully described, and a wire rope 11 with a hook 12 at its lower end, suspended from the clamp 10. The embodiment further comprises an upper supporting hook 13 having a clevis in which a pulley 14 is rotatively mounted as on a pin 15, a base member 16 adjustably secured to an upstanding tubular lug 17 on the body of the clamp 10, as by a screw-threaded connection, a bifurcated lever 18 pivotally mounted at one end of the base 16, and a cable 19, one end of which is coupled to a pin 20 in the base 16, passes over the pulley 14 and has its other end coupled to a pin 21 on the lever 18 forming a slack take-up means.

Referring to FIG. 10, the wire rope clamp 10 shown comprises a body 22 of nearly trapezoidal shape. The cover for one side is shown removed but is removably attached as by a plurality of screws 24. Within the body are a pair of essentially parallel arms 25, each pivotally mounted in the body as on a pin 26 at one end. The arms 25 are bifurcated and straddle the wire rope 11 which extends vertically through the body of the clamp. The rope 11 enters the body at the bottom of the body through a threaded sleeve fitting 28 and exits through the tubular lug 17. The arms have staggered transverse semi-circular openings 29 therethrough in which a pair of semi-circular cylinder elements 30 are respectively disposed. The flat faces of the cylinder elements 30 contain curved recesses 31 conforming to the curvature of the cable 11. Additional support elements 32 for the cylinder elements 30 may be provided if desired.

Assuming the body of the clamp 10 to be supported, tension exerted downwardly on the wire rope 11, as by a weight carried by hook 12, causes the arms 25 to pivot downwardly. The semi-circular cylinders 30 are thus shifted laterally towards each other to correspondingly grip the wire rope by coaction with openings 29 in arms 25. Conversely, if the upper end of the wire rope 11 is pulled, the arms pivot reversely and the grip of semi-circular cylinders on the wire rope is released to allow the rope to move upwardly relative to the clamp body.

Let it now be assumed that it is desired to employ the apparatus of FIGS. 1 and 2 as a binder for a load. The length of the wire rope 11 is first adjusted appropriately to surround the load and the position of the clamp 10 is fixed thereon. With the lever 18 in the position indicated in solid lines in FIG. 1 and the two hooks 12 and 13 interlocked, additional tightening adjustment of the clamp 10 relative to the wire rope 11 may now be effected. Final tightening of the rope binder is then accomplished by shifting the lever 18 to the over-center position alongside the clamp 10 indicated by the broken lines.

As shown in the drawings the handle 18 is made up of two parts threaded together so as to make the length adjustable. This provides the necessary length for leverage when needed, yet permits it to be compacted for storage.

It will be seen that if hook 12 is anchored and hook 13 secured to an object, the apparatus may be employed to drag or pull the object toward the anchored end of the wire rope 11.

It should be noted that by reason of the cable and pulley connection between the toggle lever 18 and the hook 13, frictional forces are minimized and over-center movement of the toggle lever 18 is made comparatively easy. By the same token, the reverse movement of lever 18 to loosen the wire rope binder is made relatively easy.

In FIGS. 3 and 4, a different embodiment is shown, wherein a clevis 23 is provided with a tapped hole at one end which screws on the threaded lug 17 on the body of the clamp 10. A hook 25 is secured to the distal end of the clevis, as by a pin 25' extending between the ends of the clevis arms. This form of the invention provides an end fitting in the form of a hook which can be positioned at any point along the length of a rope. Obviously another fitting than a hook could be used.

In this embodiment, the clamp 10 is first shifted along the wire rope 11 to a desired position corresponding to a desired length of wire rope 11. Clevis 23 may then be turned on the lug 17 to provide further adjustment of the position of hook 25 along the length of the wire rope 11.

In FIGS. 5 and 6, another embodiment is shown of apparatus using the wire rope clamp 10. In this embodiment the clamp 10 is disposed within a rectangular frame 27 which is independently supported as by attachment to a structural member 27'. One of the cross members 29 of the frame 27 has a hole 30 therein slightly larger in diameter than the threaded lug 17. The one end of the wire rope 11' which passes through clamp 10 has a hook 31 secured thereto, which may be attached to an object desired to be tightened. A nut 32 on the threaded lug 17 engages the bottom of cross member 29. As the nut 32 is turned on the lug 17 the clamp 10 and wire rope 11' are shifted relative to the frame 27 and structural member 27'. The arrangement thus becomes what is commonly called a "center-hole" puller. This kind of apparatus is particularly useful in furnishing stiffening between two spaced supports when the clamp must be outside the supports or for tightening around a bundle using an eye as a choker hole.

It will be apparent that the object to be pulled need not be in a straight line relation to the clamp 10, as the wire rope 11' may be threaded through one or more pulleys.

In FIG. 7, another embodiment of the apparatus is shown, wherein a clevis 23', similar to clevis 23, is screwed on the threaded lug 17 of the clamp 10 and a hook 34 is swiveled to the distal end of the clevis 23'. The one end of the wire rope 11" adjacent the tubular lug 17 is free, whereas the opposite end of the wire rope 11" is connected to a winch 35. Winch 35 may be motor operated or operated manually by a crank lever 36 as shown, and supported by a swiveled hook 37 from a convenient member (not shown). The unit is thus equivalent to what is commonly called a comealong or puller. The standard type of come-along has only six feet of pull and consequently is limited to that distance from the object to be pulled or lifted.

In contrast to the standard type of come-along, the above described apparatus is limited only by the length of wire rope 11" used. Obviously the clamp 10 may be located at any point on the wire rope 11" corresponding to the length of wire rope required.

Many winches are used only as tensioning devices to ultimately pull only a few feet of rope but need a large drum capacity because the load is located at some distance from the winch. By using the above apparatus, the weight, size and cost of the winch can be reduced.

Referring to FIGS. 8 and 9, a variation of the apparatus of FIG. 7 is shown, in which a hoisting drum or reel 39 is substituted for the winch 35. In this case, the shaft 40 of the reel is supported by a pair of struts 41 attached to a structural member or wall 42. As shown, the shaft 40 of reel 39 is turned manually by a crank 43.

In FIGS. 11 and 12 still another embodiment of the invention is illustrated in which a beam 50 is threaded onto the tubular lug 17 and extends an equal distance on opposite sides thereof. A cable 51 is attached to one end of the beam and passes through sheave 52 carrying hook 53 onto the mandrel 54 of a double action "come-along" 55. A second cable 56 is attached to the other end of the beam and to the mandrel 54 so that on rotation of handle 57 the mandrel takes up both cables moving the hooks 53 and 58 toward one another.

FIG. 13 illustrates an embodiment of this invention in which the lug 17 is threaded in one end of a beam 60. A cable 61 is attached at one end to the opposite end of beam 60 and passes over a hook sheave 62 and through the cable clamp 10. The beam 60 is provided with a center shaft 63 threaded or rotatably mounted in one end of a turnbuckle 64 having as usual a coaxial opposing threaded shaft 65 with a clevis 66. This device provides a form of infinite length turnbuckle having a vast number of applications in the field of cargo lashing and the like.

While specific embodiments of the apparatus are here shown and described, it will be understood that variations therein are possible within the scope of the following claims.

We claim:

1. A cable fastening apparatus comprising a cable of given length, a clamp means adjustably positioned on said cable intermediate its ends, fastening means on one end of said cable spaced from said clamp means, said clamp engaging the cable on movement of the cable in the direction of said one end and releasing the rope on movement of the cable in the opposite direction, a base member on the side of the clamp opposite said fastening means, and anchoring means on the clamp coaxial with the cable and on the end opposite said one end of said cable, said anchoring means rigidly securing said clamp to said base member during normal operation, said base member further being adjustably secured to said anchoring means to permit the distance between the base member and the clamp to be varied in discrete increments.

2. A cable fastening apparatus as claimed in claim 1 wherein a second cable is connected at its opposite ends to spaced apart points on said base member and forming a loop opposite said fastening means on the said cable, a hook movable on said second cable, and slack take-up means acting on said second cable to tighten the said loop.

3. Cable binder apparatus according to claim 2, wherein said slack take-up means comprises a pulley mounted on said hook, a lever having a pivotal connection with said base member, said second cable pivotally secured at opposite ends respectively to said base member and to said lever, and having the intervening part thereof running over said pulley, said lever being movable from a position in which said second cable is loose to an over-center position in which said second cable is taut.

4. Cable binder apparatus according to claim 3, wherein one end of said base member is in the form of a clevis, and wherein said lever has a bifurcated portion pivotally mounted in said clevis end of said base member, the one end of said cable being pivotally connected within the bifurcated portion of said lever.

5. Cable binder apparatus comprising a first cable of given length, a clamp means adjustably positioned on said first cable intermediate its ends, fastening means on one end of said first cable spaced from said clamp means, said clamp engaging the first cable on movement of the first cable in the direction of said one end and releasing the said first cable on movement of the first cable in the opposite direction, a base member on the side of the clamp opposite the fastening means and anchoring means on the clamp coaxial with the first cable and on the end opposite said one end of said first cable for fixing said clamp incrementally adjustably in said base member, a second cable connected at its opposite ends to said base member at spaced apart points forming a loop on said base member opposite said fastening means on the first cable, a hook movable on said second cable, and slack take-up means acting on said second cable to tighten the said loop, wherein said slack take-up means comprises a pulley mounted on said hook, a lever having a pivotal connection with said base member, said second cable pivotally secured at opposite ends respectively to said base member and to said lever, and having the intervening part thereof running over said pulley, said lever being movable from a position in which said cable is loose to an over-center position in which said cable is taut, and wherein said clamp has a threaded tubular extension through which the free end of said first cable projects, and wherein the said base member of the slack take-up means screws on said tubular extension to provide incremental adjustment.

6. A cable binder apparatus comprising a cable of given length on one end of which is an attachment member, a clamp having a body through which the cable extends and means therein for gripping the cable when tension is exerted on the said one end of the cable via the attachment member, the body of said clamp having a tubular extension at one end through which the opposite end of the cable projects, and slack take-up means incrementally adjustably mounted on said tubular extension for adjustment lengthwise relative to the cable and which is rigidly affixed to said tubular extension, without movement, during normal operation, and second attachment means fixed to said slack take-up means.

* * * * *